(12) United States Patent
Shin et al.

(10) Patent No.: US 9,523,411 B2
(45) Date of Patent: Dec. 20, 2016

(54) PLANETARY GEAR REDUCER FOR VEHICLULAR STEERING APPARATUS

(71) Applicant: Mando Corporation, Pyeongtaek-si (KR)

(72) Inventors: Kyung Sub Shin, Gwangmyeong-si (KR); Jung Sik Park, Seongnam-si (KR); Han Sang Chae, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/723,456

(22) Filed: May 28, 2015

(65) Prior Publication Data

US 2015/0345592 A1 Dec. 3, 2015

(30) Foreign Application Priority Data

Jun. 2, 2014 (KR) .......................... 10-2014-0067237

(51) Int. Cl.
| | |
|---|---|
| *F16H 57/08* | (2006.01) |
| *F16H 1/28* | (2006.01) |
| *F16H 1/36* | (2006.01) |
| *B62D 7/22* | (2006.01) |
| *F16H 57/00* | (2012.01) |
| *B62D 5/00* | (2006.01) |

(52) U.S. Cl.
CPC ............ *F16H 1/2863* (2013.01); *B62D 5/008* (2013.01); *B62D 7/224* (2013.01); *F16H 1/36* (2013.01); *F16H 57/0006* (2013.01)

(58) Field of Classification Search
None
See application file for complete search history.

(56) References Cited

U.S. PATENT DOCUMENTS

| 1,970,251 | A | * | 8/1934 | Rossman | ................. | F16H 1/28 |
| | | | | | | 475/335 |
| 2,802,377 | A | * | 8/1957 | Berthiez | ................. | B23Q 5/56 |
| | | | | | | 475/342 |
| 2,900,846 | A | * | 8/1959 | Lehman | ................. | F16H 48/10 |
| | | | | | | 475/227 |
| 3,216,270 | A | * | 11/1965 | Nasvytis | ................ | F16H 1/227 |
| | | | | | | 475/335 |
| 3,548,673 | A | * | 12/1970 | Suchocki | ................ | F16H 55/20 |
| | | | | | | 476/72 |
| 3,583,252 | A | * | 6/1971 | Shipitalo | ................. | F16H 1/48 |
| | | | | | | 475/335 |

(Continued)

FOREIGN PATENT DOCUMENTS

| GB | 2125927 A | * | 3/1984 | ......... F16H 57/0006 |
| JP | 2545309 B2 | * | 10/1996 | ........... F16H 1/2863 |

*Primary Examiner* — Dirk Wright
(74) *Attorney, Agent, or Firm* — Ladas & Parry, LLP

(57) ABSTRACT

Disclosed is a planetary gear reducer for a vehicular steering apparatus. The planetary gear reducer includes: a sun gear, to which a steering shaft is joined; a planetary gear circumscribing the sun gear; a carrier, to which a rotary shaft of the planetary gear is joined; a ring gear, in which the planetary gear is inscribed; and backlash compensation members. The backlash compensation members are coupled to one or more of the sun gear, the planetary gear, and the ring gear such that the backlash compensation members are rotated in a state where they are in close contact with each other.

9 Claims, 9 Drawing Sheets

(56) References Cited

U.S. PATENT DOCUMENTS

| | | | | |
|---|---|---|---|---|
| 4,468,985 | A * | 9/1984 | Nilsson | F16H 1/2809 |
| | | | | 475/183 |
| 4,617,839 | A * | 10/1986 | Matoba | F16H 1/28 |
| | | | | 475/331 |
| 4,901,602 | A * | 2/1990 | Matoba | F16H 1/28 |
| | | | | 475/331 |
| 6,148,684 | A * | 11/2000 | Gardiner | B41F 13/012 |
| | | | | 101/216 |
| 6,446,524 | B1 * | 9/2002 | Gravouia | E21B 19/164 |
| | | | | 74/459.5 |
| 6,626,792 | B2 * | 9/2003 | Vranish | F16C 19/50 |
| | | | | 384/550 |
| 7,537,541 | B2 * | 5/2009 | Owan | F16H 1/46 |
| | | | | 475/335 |
| 8,702,556 | B2 * | 4/2014 | Jimbo | F16D 41/00 |
| | | | | 192/41 R |

\* cited by examiner

200 : [210, 220, 230]

200 : [210, 220, 230]
300 : [310, 320]

200 : [210, 220, 230]
300 : [310, 320]

PLANETARY GEAR REDUCER FOR VEHICLULAR STEERING APPARATUS

CROSS-REFERENCE TO RELATED APPLICATION

This application claims priority from and the benefit under 35 U.S.C. §119(a) of Korean Patent Application No. 10-2014-0067237, filed on Jun. 2, 2014, which is hereby incorporated by reference for all purposes as if fully set forth herein.

BACKGROUND OF THE INVENTION

1. Field of the Invention

The present invention relates to a planetary gear reducer for a vehicular steering apparatus, and more particularly to a planetary gear reducer for a vehicular steering apparatus, in which backlash compensation members are mounted on a sun gear, a planetary gear, and a ring gear for a planetary gear reducer to be capable of compensating for an inter-gear backlash for a bi-directional input, minimizing rattle noise, and reducing damage of the gears and rattle noise caused by reverse input transferred to an output shaft.

2. Description of the Prior Art

In general, a planetary gear reducer includes a sun gear, a planetary gear supported by a carrier and circumscribing the sun gear, and a ring gear, to which the planetary gear is inscribed.

The planetary gear reducer has advantages in that it can be simply configured, and since each of constituent gears consisting of the sun gear, the planetary gear, and ring gear is set to an input shaft or an output shaft, a speed reduction ratio (or a speed increasing ratio) can be easily changed. Thus, the planetary gear reducer is frequently used for vehicular steering apparatuses.

However, in such a planetary gear reducer, inter-gear backlashes exist between the gear teeth of the sun gear and the gear teeth of the planetary gear, and between the gear teeth of the planetary gear and the gear teeth of the ring gear.

More specifically, a backlash refers to a space produced behind gear teeth meshed with each other when the gear teeth of a first gear are meshed with the gear teeth of a second gear.

Meanwhile, in a gear apparatus in which a driving gear and a driven gear are meshed with each other, no problem will occur when the speeds of the driving gear and the driven gear are constant. However, when the speeds become changed due to a certain reason, rattle noise may be generated due to an inter-gear backlash.

In the case of a vehicular steering apparatus, the rattle noise generated due to the inter-gear backlash causes displeasure at the time of steering, and gradually increases as the wear on the gear teeth progresses.

Accordingly, research has been performed on a backlash compensation structure capable of compensating for the inter-gear backlash so as to reduce the rattle noise.

As a conventional backlash compensation structure, U.S. Pat. No. 6,148,684 (issued on Nov. 21, 2000) (hereinafter, referred to as "prior art") discloses an "anti-backlash gear."

As illustrated in FIG. 1, the prior art includes a driving gear 10 and a driven gear 20 having gear teeth, of which the number is equal to the number of the gear teeth of the driving gear 10, in which each of the gears 10 and 20 is formed with a plurality of holes 30.

In addition, a plurality of spring rods 41 are mounted in a circular load ring 40, and the spring rods 41 are inserted through holes 30 that are formed in the driving gear 10 and the driven gear 20.

Accordingly, when the driving gear 10 is driven, the driven gear 20 compensates for the inter-gear backlash through the elastic variation of the spring rods 41.

The prior art may compensate for the inter-gear backlash and thus, reduce the rattle noise. However, since the load ring, the spring rods, and other separate components are used, the prior art has a problem in that the entire structure of the gears has an increased thickness and an increased weight, and the number of components increases, which causes the increase of manufacturing costs.

PRIOR ART DOCUMENT

Patent Document (Patent Document 1) U.S. Pat. No. 6,148,684.

SUMMARY OF THE INVENTION

The present invention has been conceived in order to solve the problems as described above, and an object of the present invention is to compensate for an inter-gear backlash and thus, reduce rattle noise.

Another object is to reduce the entire length and weight of a planetary gear reducer.

Still another object is to configure a backlash compensation structure to be simple and convenient so as to reduce manufacturing costs and the number of working steps.

In order to achieve the object described above, there is provided a planetary gear reducer for a vehicular steering apparatus. The planetary gear reducer includes: a sun gear, to which a steering shaft is joined; a planetary gear circumscribing the sun gear; a carrier, to which a rotary shaft of the planetary gear is joined; a ring gear, to which the planetary gear is inscribed; and backlash compensation members. The backlash compensation members are coupled to one or more of the sun gear, the planetary gear, and the ring gear such that the backlash compensation members are rotated in a state where they are in close contact with each other.

As described above, according to present invention, a planetary gear reducer for a vehicular steering apparatus includes backlash compensation members mounted the gears provided in the planetary gear reducer so that the entire length and weight of the planetary gear reducer can be reduced.

In addition, the backlash compensation member are mounted on the gears provided in the planetary gear reducer so that the backlash compensation members can compensate for an inter-gear backlash which is generated due to a bi-directional input.

In addition, backlash compensation members are mounted on the gears provided in the planetary gear reducer so that wear generated between the gears and rattle noise can be reduced.

Furthermore, backlash compensation members are mounted on the gears provided in the planetary gear reducer so that damage of the gears and rattle noise caused by a reverse input transferred to an output shaft can be reduced.

Moreover, backlash compensation members are mounted on each of the gears provided in the planetary gear reducer so that a backlash compensation structure for compensating for an inter-gear backlash can be simplified, and manufacturing costs and working steps can be reduced.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, embodiments of the present invention will be described in detail with reference to the accompanying drawings.

Figure 1:
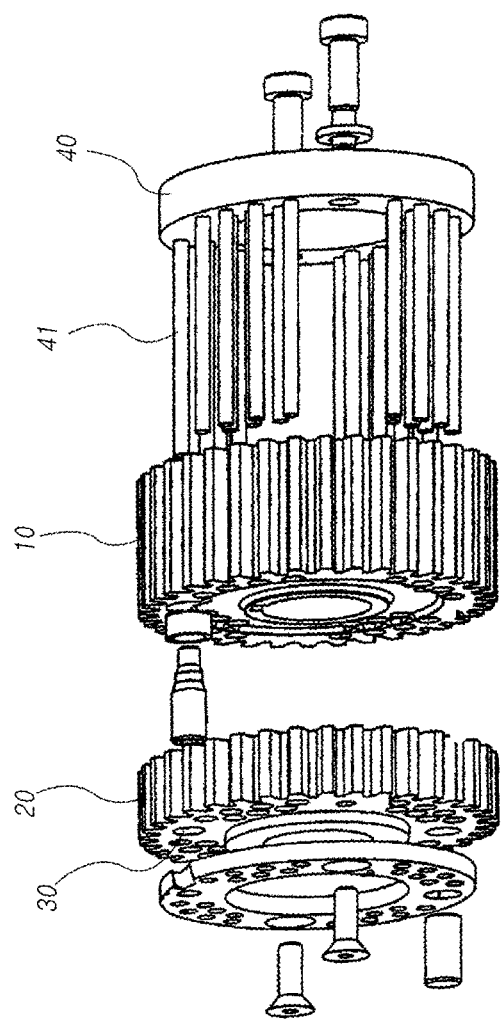
FIG. 1 is an exploded perspective view illustrating a structure of a prior art.
Figure 2:
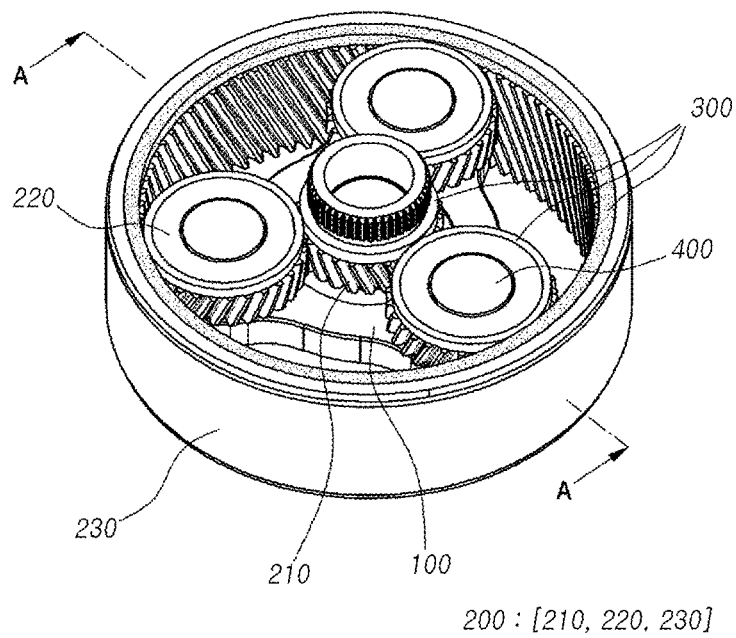
FIG. 2 is a perspective view illustrating a planetary gear reducer for a vehicular steering apparatus according to the present invention.

First, FIG. 2 is a perspective view for describing a planetary gear reducer for a vehicular steering apparatus according to the present invention. The planetary gear reducer for a vehicular steering apparatus according to the present invention includes: a gear unit 200 including a sun gear 210, to which a steering shaft (not illustrated) is joined, a planetary gear 220 circumscribing the sun gear 210, a carrier 100, to which a rotary shaft 400 of the planetary gear 220 is joined, and a ring gear 230, to which the planetary gear 220 is inscribed; and backlash compensation members 300 coupled to one or more of the sun gear 210, the planetary gear 220, and the ring gear 230 such that the backlash compensation members are rotated in a state where they are in close contact with each other.

A steering shaft (not illustrated) penetrates the carrier 100 and the sun gear 210, and the rotary shaft 400 penetrating the planetary gear 220 is press-fitted in the carrier 100.

Each of the backlash compensation members 300 mounted in the gear unit 200 has a ring shape or a shape of a ring with one slit side, and is formed of an elastic material. Here, the backlash compensation members 300 may be coupled to one or more of the sun gear 210, the planetary gear 220, and the ring gear 230.

In addition, the backlash compensation members 300 may be coupled to two gears, which are meshed with each other, among the sun gear 210, the planetary gear 220, and the ring gear 230, or coupled to the sun gear 210, the planetary gear 220, and the ring gear 230, respectively, such that the backlash compensation members 300 are in close contact with each other.

In addition, the backlash compensation members 300 may include a first backlash compensation member 310 made of an elastic material and a second backlash compensation member 320 made of a metallic material, as described below.

When the backlash compensation members 300 include the first backlash compensation member 310 and the second backlash compensation member 320 as described above, only the first backlash compensation member 310 may be mounted in the gear unit 200, or the first backlash compensation members 310 and the second backlash compensation members 320 may be alternately mounted such that the second backlash compensation members 320 are rotated in a state where they are in close contact with the first backlash compensation members 310.

Figure 3:
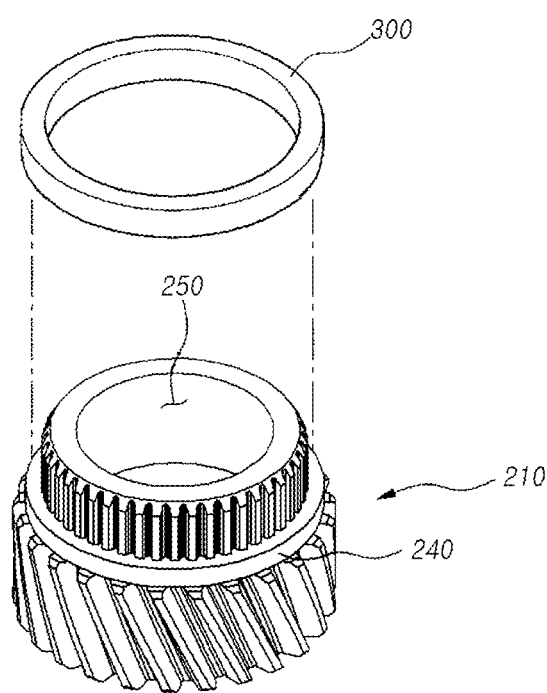
FIG. 3 is a perspective view illustrating a sun gear in the planetary gear reducer for a vehicular steering apparatus according to the present invention.
Figure 4:
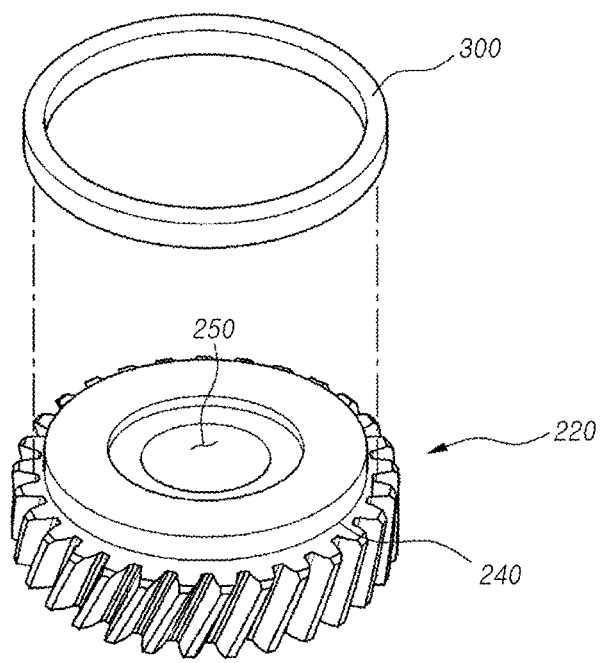
FIG. 4 is a perspective view illustrating a planetary gear in the planetary gear reducer for a vehicular steering apparatus according to the present invention.
Figure 5:
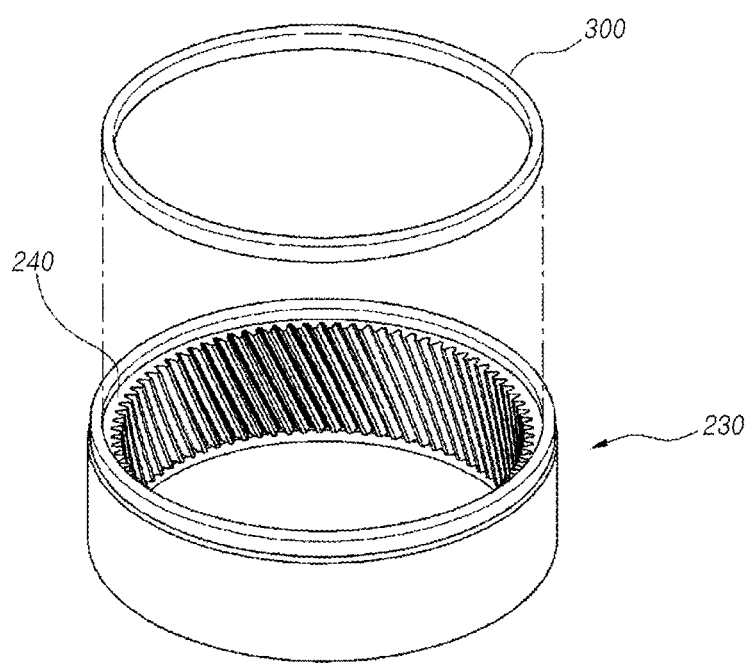
FIG. 5 is a perspective view illustrating a ring gear in the planetary gear reducer for a vehicular steering apparatus according to the present invention.

FIGS. 3 to 5 are exploded perspective views for describing the gear unit 200 in the planetary gear reducer for a vehicular steering apparatus according to the present invention. Each of the sun gear 210 and the planetary gear 220 includes a through-hole 250 formed at the center thereof, and each of the sun gear 210 and the planetary gear 220 is provided with an axially stepped fastening flange 240 around the outer circumferential surface thereof.

In addition, the ring gear 230 is provided with an axially stepped fastening flange 240 around an inner circumferential surface thereof. A ring-shaped backlash compensation member 300 is mounted on each fastening flange 240 formed in the gear unit 200.

Figure 6:
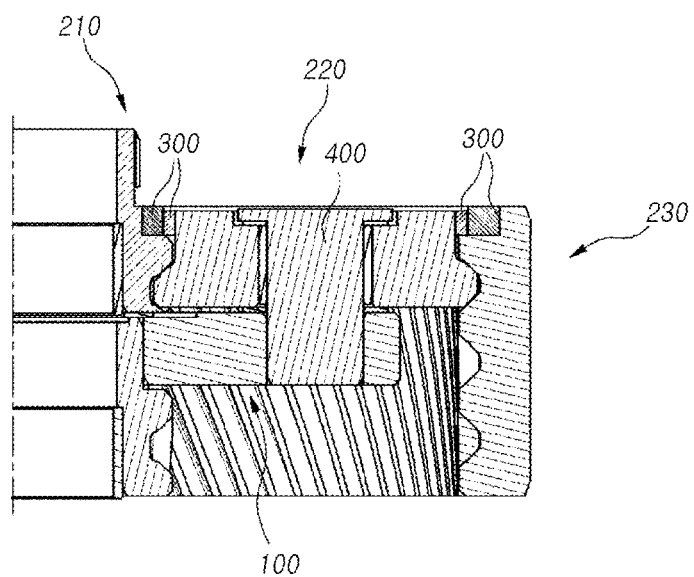
FIG. 6 is a sectional view taken along line A-A in FIG. 2.

FIG. 6 is a sectional view of the gear unit 200 taken along line A-A in FIG. 2, in which the gear unit 200 is mounted with the backlash compensation members 300 in the planetary gear reducer for a vehicular steering apparatus.

The sun gear 210 is positioned on the carrier 100, planetary gears 220 circumscribe a sun gear 210, and a rotary shaft 400 penetrating the planetary gear 220 is press-fitted in the carrier 100.

In addition, the ring gear 230 is positioned around the carrier 100, and the planetary gear 220 is inscribed to the ring gear 230.

With reference to the carrier 100, on the upper portions of outer circumferential surfaces of the sun gear 210 and the planetary gear 220, and the upper portion of the inner circumferential surface of the ring gear 230, the fastening flanges 240, each of which is formed with an axial step, are provided, and the backlash compensation members 300 are mounted on the fastening flanges 240.

Here, the fastening flanges 240 are formed on the upper portions of the outer circumferential surfaces of the sun gear 210 and the planetary gear 220, and the upper portion of the inner circumferential surface of the ring gear 230, and are not necessarily limited thereto. The fastening flanges 240 may be formed on the middle portions or lower portions.

The backlash compensation members 300 mounted in the gear unit 200 are in close contact with each other, and when the gear unit 200 is rotated by driving the steering shaft (not illustrated), the backlash compensation members 300 are also rotated in the state where they are continuously in close contact with each other.

Accordingly, the backlash compensation members 300 are rotated in the state where they are continuously in close contact with each other to compensate for the inter-gear backlash in the gears mounted in the gear unit 200 when the steering shaft (not illustrated) is driven bi-directionally, so that the smooth and reliable engagement state of the gears can be maintained, the wear between the gears can be reduced, and the shaking between the gears can be cancelled by the elastic deformation between the backlash compensation members 300, thereby reducing rattle noise.

In addition, when the vehicle travels, a reverse input caused by uncertain external force transferred from the ground may be transferred to the steering shaft (not illustrated) connected to the front wheel side, which may cause shaking in the gears.

Even in this case, the shaking caused in the gears can be cancelled by the elastic deformation between the backlash compensation members 300 so that damage of the gears and rattle noise can be prevented.

Figure 7:
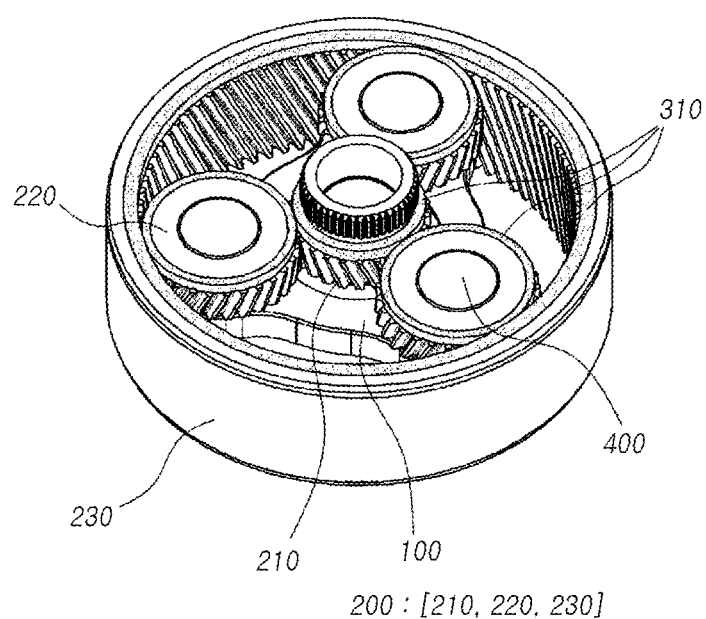
FIG. 7 is a view illustrating a first embodiment of the planetary gear reducer for a vehicular steering apparatus according to the present invention.

FIG. 7 is a perspective view illustrating a first embodiment of the planetary gear reducer for a vehicular steering apparatus according to the present invention, in which the sun gear 210 positioned on the carrier 100 circumscribes the planetary gears 220, the planetary gears 220 are inscribed to the ring gear 230, and the backlash compensation members 300 are mounted on the fastening flanges 240 of the gear unit 200 to be in close contact with each other.

Here, the backlash compensation members 300 include a first backlash compensation member 310 made of an elastic material, and a second backlash compensation member 320 made of a metallic material having a smooth surface. In the present embodiment, the first backlash compensation members 310 are mounted in the gear unit 200.

Accordingly, when the steering shaft (not illustrated) is driven bi-directionally, the first backlash compensation members 310 mounted in the gear unit 200 are rotated in the state where they are continuously in close contact with each other to compensate for the inter-gear backlash, so that the gears can be maintained in the state where the teeth thereof are smoothly and reliably meshed with each other, the wear between the gears can be reduced, and the shaking between the gears can be cancelled by the elastic deformation between the first backlash compensation members, thereby reducing rattle noise.

However, when only the first backlash compensation members 310 are mounted in the gear unit 200, the progress of wear of the first backlash compensation members 310 may become faster. Thus, as in second and third embodiments described below, the second backlash compensation members 320 made of a metallic material may be applied to the gear unit 200.

Figure 8:
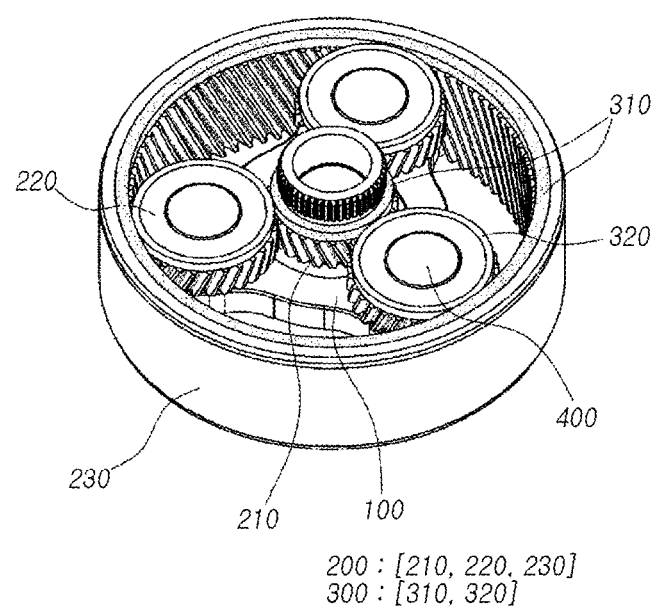
FIG. 8 is a view illustrating a second embodiment of the planetary gear reducer for a vehicular steering apparatus according to the present invention.

FIG. 8 is a perspective view illustrating the second embodiment of the planetary gear reducer for a vehicular steering apparatus according to the present invention, in which the planetary gears 220 circumscribe the sun gear 210 positioned on the carrier 100, the planetary gears 220 are inscribed to the ring gear 230, and the backlash compensation members 300 are mounted on the fastening flanges 240 of the gear unit 200 to be in close contact with each other.

In the present embodiment, the first backlash compensation members 310 made of an elastic material and the second backlash compensation members 320 made of a metallic material with a smooth surface are mounted in the gear unit 200.

Here, the material of the second backlash compensation members 320 is not limited to the metallic material, and any material may be applied thereto so long as it is rigid and has a smooth surface.

The first backlash compensation members 310 function to cancel the shaking generated in the gears via the elastic deformation thereof. Thus, one first backlash compensation member 310 is mounted on the sun gear 210, the second backlash compensation members 320 are mounted on the planetary gears 220 circumscribing the sun gear 210 and another first backlash compensation member 310 is mounted on the ring gear 230 in which the planetary gears 220 are inscribed.

Accordingly, when the steering shaft (not illustrated) is driven bi-directionally, the first backlash compensation members 310 and the second back lash compensation members 320 mounted in the gear unit 200 are rotated in the state where they are continuously in close contact with each other to compensate for the inter-gear backlash, so that the gears can be maintained in the state where the teeth thereof are smoothly and reliably meshed with each other, the wear between the gears can be reduced, and the shaking between the gears can be cancelled by the elastic deformation between the first backlash compensation members 310, thereby reducing rattle noise.

In addition, since the first backlash compensation members 310 and the second backlash compensation members 320 are mounted in the gear unit 200 and rotated in the state where they are continuously in close contact with each other, it is possible to delay the progress of wear of the first backlash compensation members 310.

Figure 9:
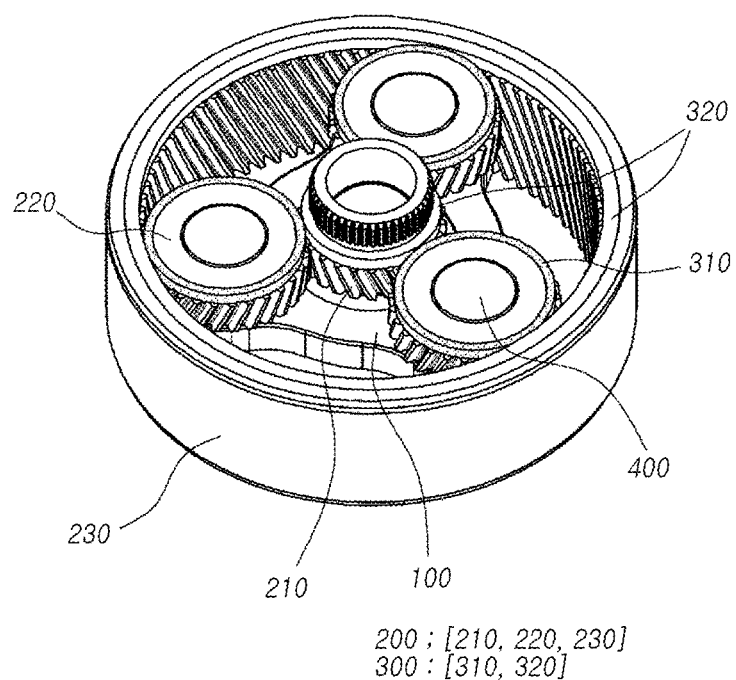
FIG. 9 is a view illustrating a third embodiment of the planetary gear reducer for a vehicular steering apparatus according to the present invention.

FIG. 9 is a perspective view illustrating the third embodiment of the planetary gear reducer for a vehicular steering apparatus according to the present invention, in which the planetary gears 220 circumscribe the sun gear 210 positioned on the carrier 100, the planetary gears 220 are inscribed in the ring gear 230, and the backlash compensation members 300 are mounted on the fastening flanges 240 of the gear unit 200 to be in close contact with each other.

In the present embodiment, the first backlash compensation members 310 made of an elastic material and the second backlash compensation members 320 made of a metallic material are mounted in the gear unit 200.

Here, the material of the second backlash compensation members 320 is not limited to the metallic material, and any material may be applied thereto so long as it is rigid and has a smooth surface.

The first backlash compensation members 310 function to cancel the shaking generated in the gears via the elastic deformation thereof. Thus, one second backlash compensation member 320 is mounted on the sun gear 210, the first backlash compensation members 310 are mounted on the planetary gears 220 circumscribing the sun gear 210.

In addition, another second backlash compensation member 320 is mounted on the ring gear 230 in which the planetary gears 220 are inscribed.

Accordingly, when the steering shaft (not illustrated) is driven bi-directionally, the first backlash compensation members 310 and the second backlash compensation members 320 mounted in the gear unit 200 are rotated in the state where they are continuously in close contact with each other to compensate for the inter-gear backlash, so that the gears can be maintained in the state where the teeth thereof are smoothly and reliably meshed with each other, the wear between the gears can be reduced, and the shaking between the gears can be cancelled by the elastic deformation between the first backlash compensation members 310, thereby reducing rattle noise.

In addition, since the first backlash compensation members 310 and the second backlash compensation members 320 are mounted in the gear unit 200 and rotated in the state where they are continuously in close contact with each other, it is possible to delay the progress of wear of the first backlash compensation members 310.

In the foregoing, the planetary gear reducer for a vehicular steering apparatus according to the present invention has been described focused on specific shapes and directions with reference to the accompanying drawings. However, various modifications and changes may be made to the present invention by a person ordinarily skilled in the art, and thus, the modifications and changes shall be deemed as being belonging to the scope of the present invention.

What is claimed is:

1. A planetary gear reducer for a vehicular steering apparatus, the planetary gear reducer comprising:
    a sun gear, to which a steering shaft is joined;
    a planetary gear circumscribing the sun gear;
    a carrier, to which a rotary shaft of the planetary gear is joined;
    a ring gear, in which the planetary gear is inscribed; and
    one or more backlash compensation members coupled to each of the sun gear, the planetary gear, and the ring gear such that the backlash compensation members are rotated in a state where the backlash compensation members are in close contact with each other.

2. The planetary gear reducer of claim 1, wherein each of the backlash compensation members is formed in a ring shape or in a shape of a ring slit at one side.

3. The planetary gear reducer of claim 2, wherein each of the sun gear, the planetary gear, and the ring gear is provided with an axially stepped fastening flange that extends around a circumference thereof such that one of the backlash compensation members can be seated on the fastening flange.

4. The planetary gear reducer of claim 3, wherein each of the backlash compensation members is formed of an elastic material.

5. The planetary gear reducer of claim 3, wherein the backlash compensation members are coupled to two gears that are meshed with each other, among the sun gear, the planetary gear, and the ring gear, such that the backlash compensation members are in close contact with each other.

6. The planetary gear reducer of claim 5, wherein the backlash compensation members include a first backlash compensation member formed of an elastic material and a second backlash compensation member formed of a metallic material, and the first backlash compensation member and the second backlash compensation member are coupled to be in close contact with each other.

7. The planetary gear reducer of claim 1, wherein the backlash compensation members include a first backlash compensation member formed of an elastic material and a second backlash compensation member formed of a metallic material, and the first backlash compensation member and the second backlash compensation member are coupled to be in close contact with each other.

8. The planetary gear reducer of claim 7, wherein the first backlash compensation member is coupled to each of the sun gear and the ring gear, and the second backlash compensation member is coupled to the planetary gear.

9. The planetary gear reducer of claim 7, wherein the second backlash compensation member is coupled to each of the sun gear and the ring gear, and the first backlash compensation member is coupled to the planetary gear.

* * * * *